(12) United States Patent
Simileysky et al.

(10) Patent No.: US 12,008,106 B2
(45) Date of Patent: Jun. 11, 2024

(54) SYSTEMS, METHODS, AND DEVICES FOR SECURITY ATTRIBUTE CACHING AND ACCELERATED WAKE TIMES OF SECURED ENVIRONMENTS

(71) Applicant: Cypress Semiconductor Corporation, San Jose, CA (US)

(72) Inventors: Victor Simileysky, San Jose, CA (US); Jacek Dobaczewski, San Diego, CA (US); Roman Baker, San Jose, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 316 days.

(21) Appl. No.: 17/501,922

(22) Filed: Oct. 14, 2021

(65) Prior Publication Data
US 2023/0117694 A1    Apr. 20, 2023

(51) Int. Cl.
*G06F 21/57* (2013.01)
*H04L 9/06* (2006.01)

(52) U.S. Cl.
CPC .......... *G06F 21/572* (2013.01); *H04L 9/0643* (2013.01); *G06F 2221/033* (2013.01); *G06F 2221/2149* (2013.01)

(58) Field of Classification Search
CPC ............. G06F 21/572; G06F 2221/033; G06F 2221/2149; G06F 21/50; G06F 21/51; G06F 21/52; G06F 21/53; G06F 21/57; G06F 21/575; H04L 9/0643
See application file for complete search history.

(56) References Cited

U.S. PATENT DOCUMENTS

| 8,560,823 B1 * | 10/2013 | Aytek | G06F 8/654 |
| | | | 713/2 |
| 2016/0055332 A1 * | 2/2016 | Jeansonne | G06F 9/4406 |
| | | | 726/22 |
| 2017/0093582 A1 * | 3/2017 | Keidar | G06F 9/4416 |
| 2021/0397715 A1 * | 12/2021 | Duval | G06F 21/57 |

* cited by examiner

*Primary Examiner* — Malcolm Cribbs

(57) ABSTRACT

Systems, methods, and devices authenticate operations for secured execution environments. Methods include performing, using one or more processing elements of a secured execution environment, a first cryptographic computation on a portion of code to generate a result. Methods also include determining, using the one or more processing elements, an authenticated version of a cryptographic value, the authenticated version of the cryptographic value being determined based on a signature computation and a second cryptographic computation that is an asymmetric cryptographic computation. Methods further include determining, using the one or more processing elements, if the result of the first cryptographic computation is verified based, at least in part, on a comparison with the authenticated version of the cryptographic value.

20 Claims, 6 Drawing Sheets

SYSTEMS, METHODS, AND DEVICES FOR SECURITY ATTRIBUTE CACHING AND ACCELERATED WAKE TIMES OF SECURED ENVIRONMENTS

TECHNICAL FIELD

This disclosure generally relates to secured execution environments, and more specifically, to authentication operations associated with such secured execution environments.

BACKGROUND

Processors may undergo various processes when commencing operation and being initialized. For example, a processor may undergo one or more boot operations when being initialized, and when associated software is being loaded and initialized. For example, a boot loader may be used to implement such boot operations. Accordingly, code may be loaded and utilized during boot operations implemented when a device is initialized or transitions from a sleep mode to a wake mode. Such code may undergo one or more authentication operations to verify that the code has not been impermissibly altered. Conventional devices remain limited in their ability to implement such authentication and boot operations in an efficient manner that uses a reduced amount of power.

DETAILED DESCRIPTION

Figure 1:
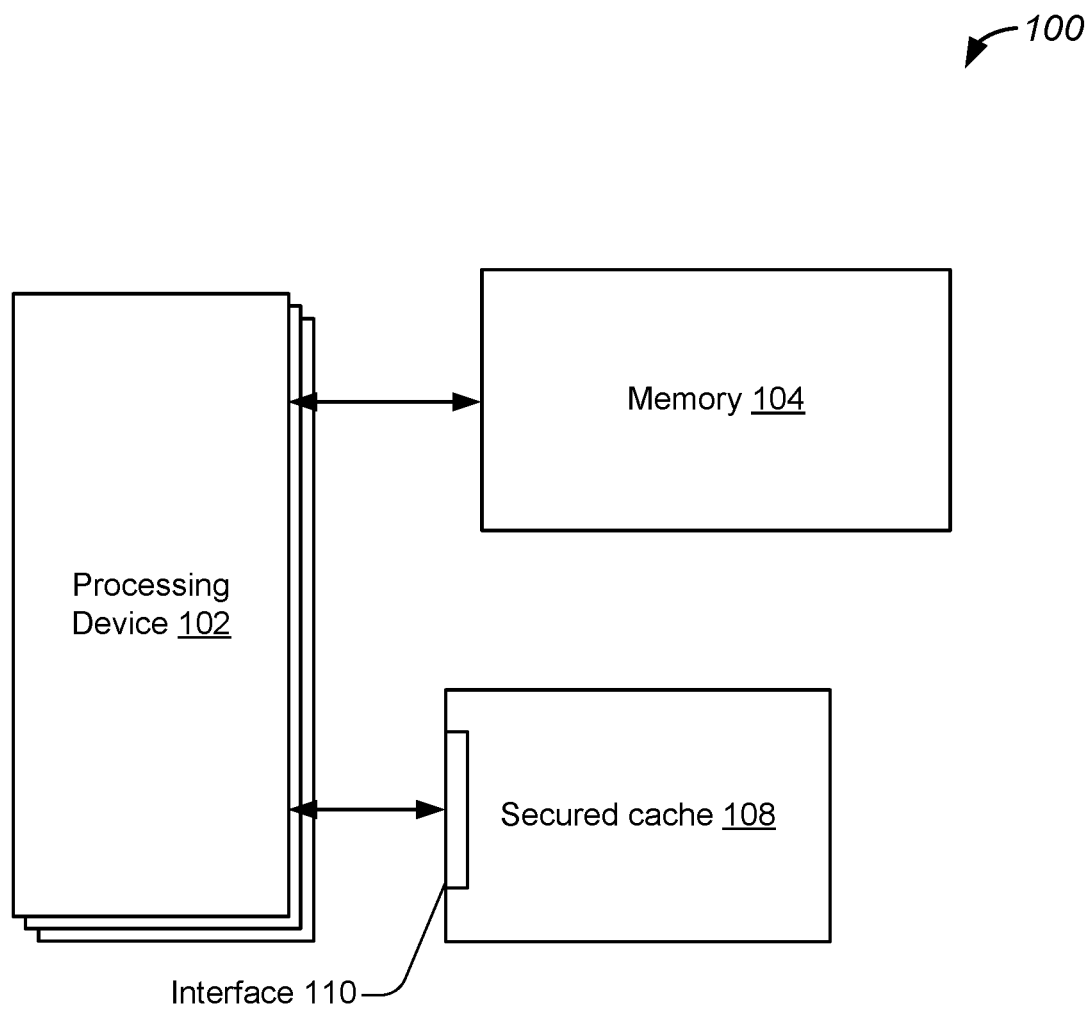
FIG. 1 illustrates an example of a system for secured authentication operations, configured in accordance with some embodiments.

In the following description, numerous specific details are set forth in order to provide a thorough understanding of the presented concepts. The presented concepts may be practiced without some or all of these specific details. In other instances, well known process operations have not been described in detail so as not to unnecessarily obscure the described concepts. While some concepts will be described in conjunction with the specific examples, it will be understood that these examples are not intended to be limiting.

Secured execution environments may be implemented using one or more components of a processor that are configured to provide a trusted execution environment for various types of processing operations, such as boot operations. Accordingly, the secured execution environment may be an isolated execution environment that is configured to provide various security features that may be defined based, at least in part, on one or more security attributes. Thus, a secured execution environment may be used to implement a Root of Trust (RoT) that may be part of a chain of trust used for specific operations, such as boot operations. In this way, a secured execution environment may be configured to ensure security of a boot process.

In one example, a processor may use such a secured execution environment to authenticate boot code and manage boot operations when a device is turned on or emerges from a sleep mode. Such authentication operations may include one or more cryptographic and signature computation and verification operations. Conventional secured execution environments remain limited because they require additional iterations of such signature computation and verification operations each time a host device or system wakes from a sleep mode, and such additional iterations result in increased overall power consumption of such host devices and/or systems as well as increased times associated with such iterations.

Embodiments disclosed herein enable the implementation of secured execution environments with reduced power consumption and processing time associated with processing operations implemented within such secured execution environments. As will be discussed in greater detail below, a processor may be used to implement a portion of the secured execution environment, and may handle the secured execution of one or more operations, such as boot operations. Moreover, as will also be discussed in greater detail below, a secure cache may be used to store security attributes and other data values associated with cryptographic and verification operations. Data values stored in such a secure cache may be used in subsequent iterations of operations, such boot operations. Accordingly, as will be discussed in greater detail below, aspects of a boot process may be configured to enable the retrieval and use of data values stored in the secure cache, which remains within the secured execution environment, to additional iterations of processing operations, such as signature computation operations. In this way, an overall power consumption and processing time associated with boot operations, such as wake operations, are reduced.

FIG. 1 illustrates an example of a system for secured authentication operations, configured in accordance with some embodiments. As will be discussed in greater detail below, a system, such as system 100 may utilize a secured processing environment to implement validation operations for one or more processes associated with a chain of trust, as may be included in an RoT as similarly discussed above. In various embodiments, such processes may be a portion of a boot process. As will be discussed in greater detail below, one or more components of system 100 may be configured to utilize a dedicated secure storage to reduce processing overhead and latency associated with signature computations and verification operations.

System 100 includes processing device 102, which may be configured to execute processing operations. In various embodiments, processing device 102 is configured to support an operating environment for one or more applications. In one example, processing device 102 may be a mobile application processor or may be some other host processor for a computing system. In some embodiments, processing device 102 may be implemented via a system on a chip (SoC) or other suitable processing hardware, such as an integrated circuit (IC) package. It will be appreciated that processing device 102 may be any suitable type of processor. As will be discussed in greater detail below, processing device 102 may be initialized using one or more boot operations stored in boot code that may be handled by a boot loader.

In various embodiments, processing device 102 is configured to implement a Root of Trust (RoT). Accordingly, processing device 102 may be configured to provide a trusted execution environment that is always trusted by other system components. Accordingly, processing device 102 may include a processing environment that is always encrypted, thus maintaining the secured execution environment. Accordingly, processing device 102 may be configured to provide a secure execution environment for cryptographic and verification operations during a booting process. As will be discussed in greater detail below, such cryptographic and verification operations may be used to authenticate boot code or one or more portions of associated application code, thus enabling processing device 102 to authenticate boot operations and manage the booting process of system 100. Additional details regarding secured execution environments are discussed in greater detail below with reference to at least FIG. 2.

In various embodiments, system 100 may also include a memory device, such as memory 104, that may store data accessed by processing device 102. For example, memory 104 may be configured to store additional code underlying authentication and validation operations, as will be discussed in greater detail below. For example, memory 104 may be configured to store boot code, such as one or more stages of a boot loader, as well as application code. Moreover, memory 104 may also store one or more results of cryptographic computations. In some embodiments, memory 104 is a nonvolatile memory. In various embodiments, memory 104 is configured to be communicatively coupled with processing device 102 via an interface, such as a dynamic random-access memory (DRAM) interface.

System 100 additionally includes a secured cache, such as secured cache 108 that is configured to communicate with processing device 102 via interface 110. Accordingly, as will be discussed in greater detail below, secured cache 108 may be configured to include one or more storage regions that are always encrypted, thus maintaining a secured storage location for the secured execution environment. Furthermore, additional rules may be specified to define and configure permissible read and write operations associated with secured cache 108. For example, secured cache 108 may be configured to only support write operations in response to a system event, such as a reset, occurring. In some embodiments, such security rules may be determined by an entity, such as a manufacturer, during an initial configuration operation. As will be discussed in greater detail below with reference to FIGS. 2-6, secured cache 108 is configured to provide a trusted storage location for processing device 102 that may be used to cache one or more data values used during operations performed within the secured execution environment. For example, a cached signature value may be stored in secured cache 108 and used in subsequent boot operations to reduce the implementation of redundant signature computation operations and their associated processing overhead.

Figure 2:
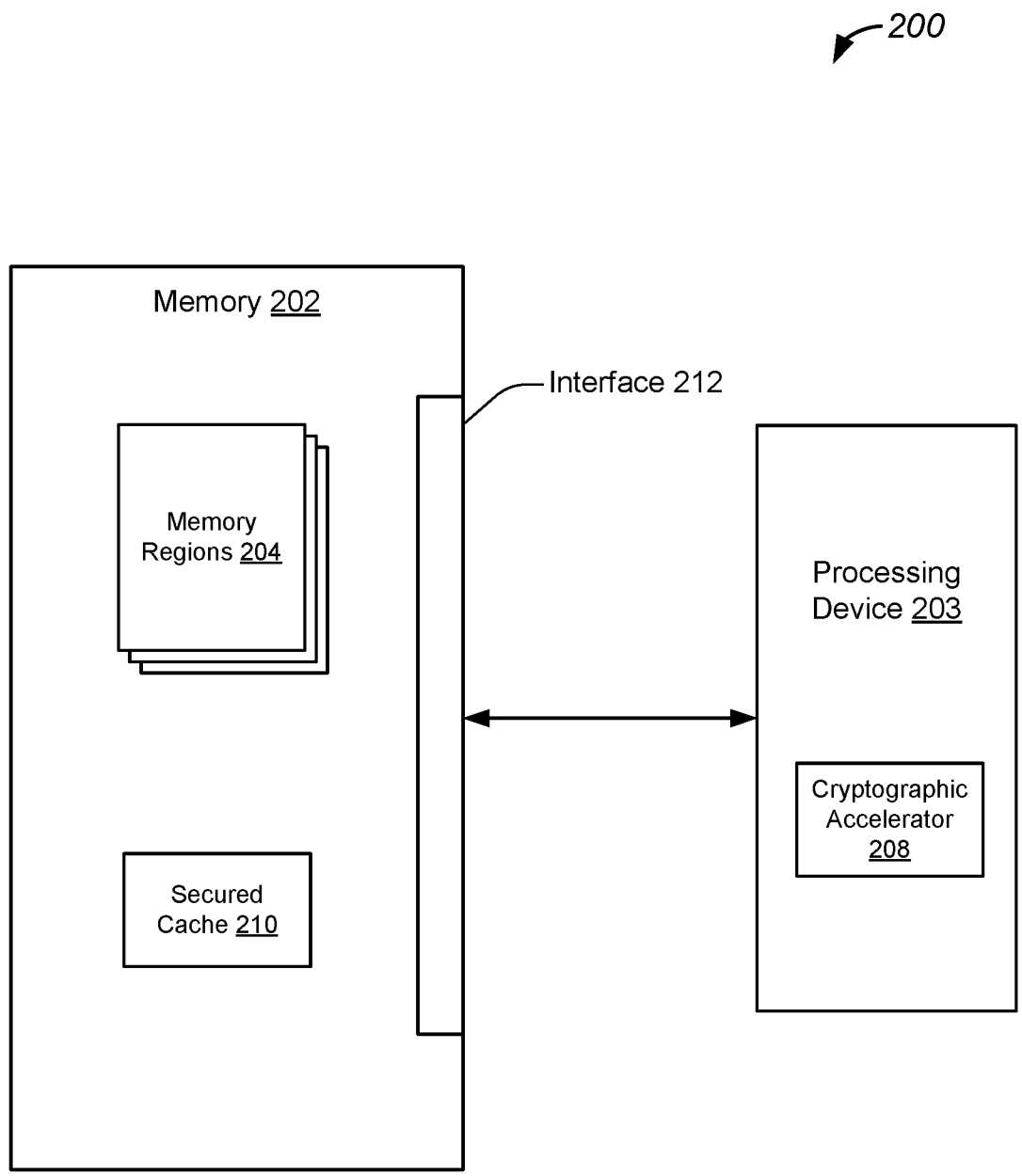
FIG. 2 illustrates an example of a device for secured authentication operations, configured in accordance with some embodiments.

FIG. 2 illustrates an example of a device for secured authentication operations, configured in accordance with some embodiments. As similarly discussed above, secured execution environments may be used for authentication and validation operations during a booting process. In various embodiments, a system, such as system 200 may utilize a secured processing environment to implement authentication and validation operations for one or more processes associated with a chain of trust, as may be included in an RoT as similarly discussed above. System 200 illustrates an additional example of a processor and a memory that are configured to utilize a dedicated secure storage to reduce processing overhead and latency associated with signature computations and verification operations.

Accordingly, system 200 includes memory 202 which is configured to provide one or more storage locations for processing device 203. Accordingly, memory 202 may include memory regions 204 that may be configured to store code underlying authentication and validation operations. For example, memory 202 may be configured to store boot code, such as one or more stages of a boot loader, as well as application code, and such code may be stored in one or more of memory regions 204. In various embodiments, memory 202 additionally includes secured cache 210 that is configured to include one or more storage regions that are always encrypted, thus being secured storage regions that maintain a secured storage location for the secured execution environment. As similarly discussed above, one or more rules may define and configure permissible read and write operations associated with secured cache 210. Accordingly, secured cache 210 is configured to provide a trusted storage location for processing device 203 that may be used to cache one or more data values used during operations performed within the secured execution environment. As shown in FIG. 2, secured cache 210 is implemented within memory 202, and thus may be included in the same memory module as various other system memory regions, such as memory regions 204.

In various embodiments, memory 202 communicates with processing device 203 via interface 212. As similarly discussed above, processing device 203 may be configured to execute processing operations, and further configured to support an operating environment for one or more applications. In some embodiments, processing device 203 may be implemented via a system on a chip (SoC) or other suitable processing hardware, such as an integrated circuit (IC) package. It will be appreciated that processing device 203 may be any suitable type of processor. As will be discussed in greater detail below, processing device 203 may be initialized using one or more boot operations stored in boot code that may be handled by a boot loader.

In various embodiments, processing device 203 is configured to implement a Root of Trust (RoT). Accordingly, processing device 203 is configured to include a processing environment that is always encrypted, thus maintaining the secured execution environment. As will be discussed in greater detail below with reference to FIGS. 3-6, processing device 203 may also be configured to implement processing operations, such as boot operations and comparison operations not handled by cryptographic accelerator 208 discussed in greater detail below.

In various embodiments, processing device 203 additionally includes cryptographic accelerator 208 which may be configured to implement one or more cryptographic computations. Accordingly, cryptographic accelerator 208 may perform cryptographic computations, such as the computation of hash values, that may underly verification and authentication operations. It will be appreciated that the cryptographic computations may include the computation of any suitable integrity check values, such as a secure hash algorithm (SHA) values or keyed-hash message authentication codes (HMACs). In some embodiments, cryptographic accelerator 208 may also be used to perform signature computations that may be used to verify code via an asymmetric cryptographic computation, such as elliptic curve cryptography (ECC) functions or Rivest-Shamir-Adleman (RSA) functions. For example, cryptographic accelerator 208 is configured to support and implement an ECC function that uses public keys ECC-based authentication. It will be appreciated that cryptographic accelerator 208 may be configured to compute any suitable type of signature value. Accordingly, cryptographic accelerator 208 may include one or more processing elements implemented within the secured execution environment, and configured to perform computations discussed in greater detail below with reference to FIGS. 3-6.

Figure 3:
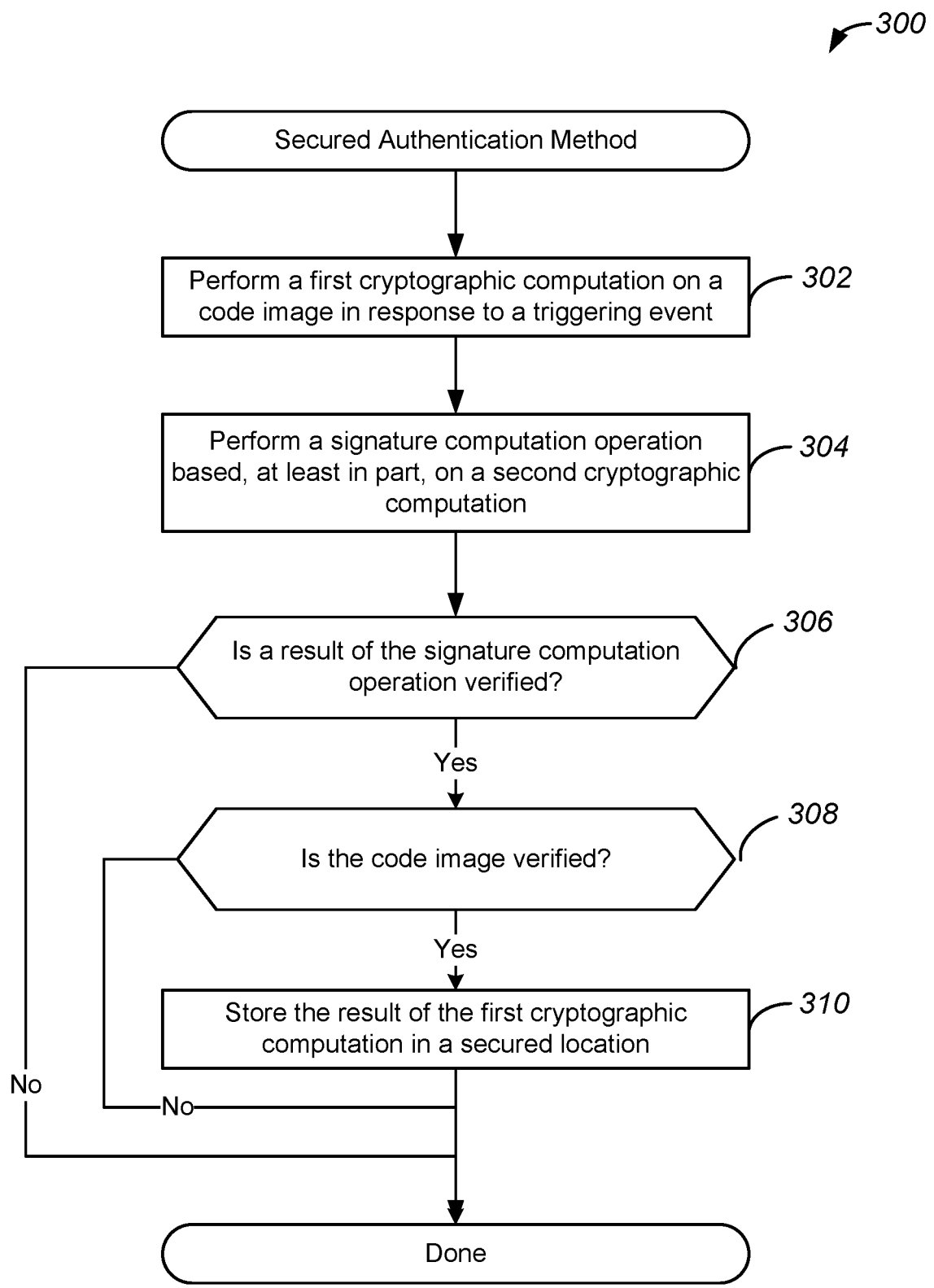
FIG. 3 illustrates an example of a method for secured authentication operations, implemented in accordance with some embodiments.

FIG. 3 illustrates an example of a method for secured authentication operations, implemented in accordance with some embodiments. As will be discussed in greater detail below, a method, such as method 300 may be performed to implement validation and authentication operations, as may occur during a secure boot process. Computed values may be cached and stored within the secured execution environment, thus reducing redundant computations associated with such values in subsequent iterations of validation and authentication operations. In this way, processing overhead and latency associated with signature computations and verification operations may be reduced.

Method 300 may perform operation 302 during which a first cryptographic computation may be performed on a code image in response to a triggering event. In various embodiments, the triggering event may be a system event such as the powering on of a device. Accordingly, the triggering event may be some event causing the boot of the device, and commencement of operation of the device. In response to such an event, a code image may be obtained. The code image may be of boot code used to commence booting operations. In some embodiments, the first cryptographic computation may be performed to compute an integrity check value. For example, the first cryptographic computation may be a hash function, and during operation 302, a first hash value may be computed for the code image.

Method 300 may perform operation 304 during which a signature computation operation may be performed based, at least in part, on a second cryptographic computation. In various embodiments, signature computation operation may be a secured signature computation used to compute a signature value based on a signed version of a hash value that may have included with the code underlying operation 302. Accordingly, a signed version of a precomputed hash value may have been included with the code, and during operation 304, a signature computation operation may be performed to compute a signature value for the signed version of the hash value. In various embodiments, the signature value may be computed in accordance with an authentication algorithm, such as ECC or RSA.

Method 300 may perform operation 306 during which it may be determined if a result of the signature computation is verified. The signature may then be verified using a public key associated with the authentication algorithm used to sign the precomputed hash value. Accordingly, the signature of the precomputed hash value may be verified, and a result of such verification may be used to determine if the precomputed hash value is authentic and may be used for subsequent verification operations. In this way, an authenticated version of a cryptographic value, such as a precomputed hash value, may be determined. Accordingly, if it is determined that the result of the signature computation is not verified, method 300 may terminate. If it is determined that the result of the signature computation is verified, method 300 may proceed to operation 308.

Method 300 may perform operation 308 during which it may be determined if the code image is verified. Accordingly, the result of the first cryptographic computation may be compared against the precomputed verified result. If it is determined that the results do not match, method 300 may terminate. If it is determined that the results do match, method 300 may proceed to operation 310.

Method 300 may perform operation 310 during which a result of the first cryptographic computation may be stored in a secured location. Accordingly, the result of the first cryptographic computation may be stored in the secured location which may be a secured cached that is only accessible by the secured execution environment. As will be discussed in greater detail below, the stored result may be used in subsequent boot operations that may occur in response to subsequent triggering events. Moreover, the stored result may be used to bypass signature computations that may otherwise occur in such subsequent boot operations.

Figure 4:
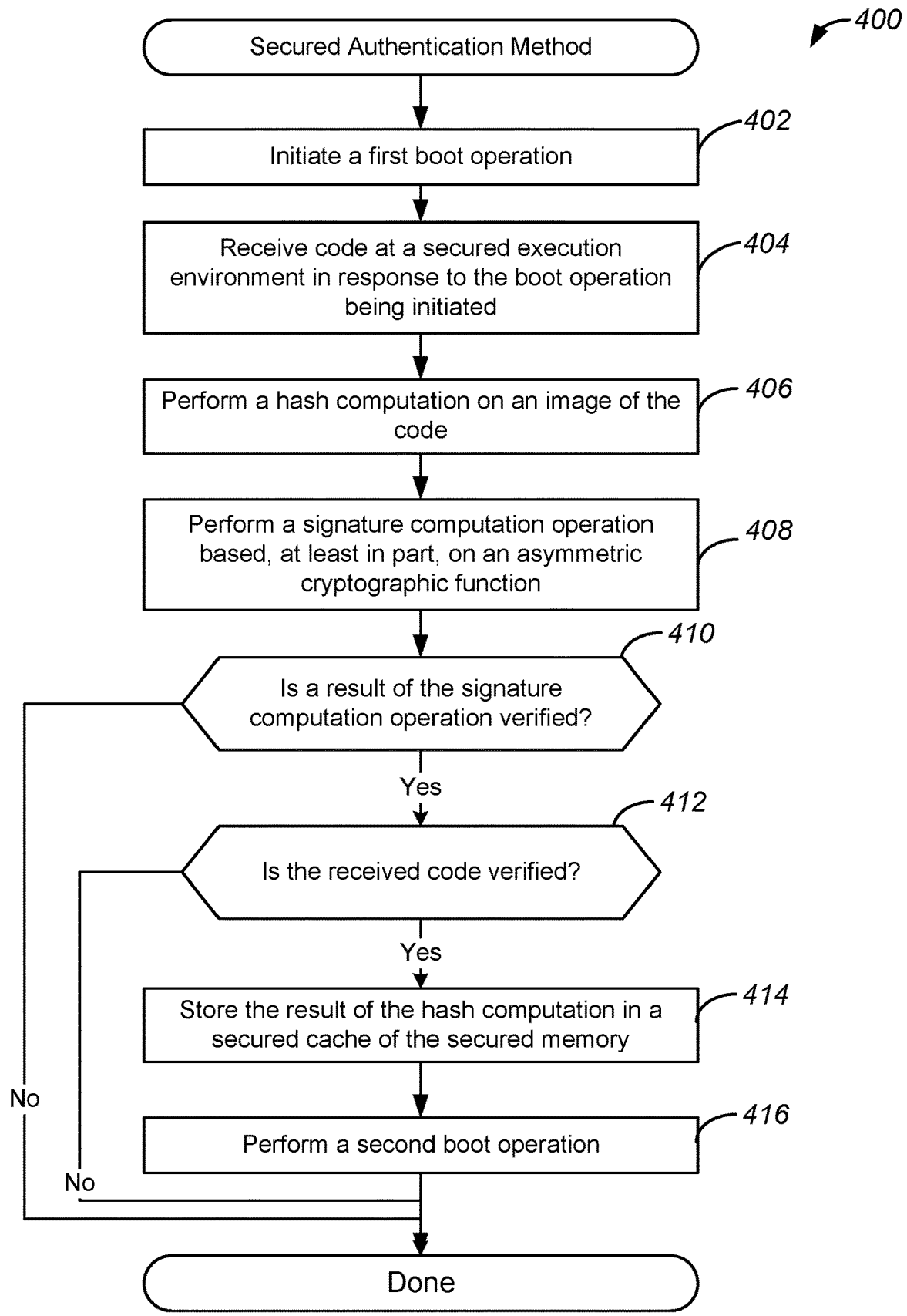
FIG. 4 illustrates an example of another method for secured authentication operations, implemented in accordance with some embodiments.

FIG. 4 illustrates an example of another method for secured authentication operations, implemented in accordance with some embodiments. As will be discussed in greater detail below, a method, such as method 400 may be performed to implement validation and authentication operations, as may occur during a secure boot process. Furthermore, an authentication process may be split into different stages, thus enabling results from one or more signature computation operations to be leveraged towards subsequent iterations, and avoiding redundancy of such signature computation operations in such subsequent iterations. In this way, processing overhead and latency associated with signature computations and verification operations may be reduced.

Method 400 may perform operation 402 during which a first boot operation may be initiated. As discussed above, a boot operation may be performed in response to a particular triggering event, such as a device being turned on or initialized. Accordingly, during operation 402, a portion of code associated with such a boot operation may be identified. Such code may be boot code as may be included in a boot loader. Such code may be stored in system memory. In some embodiments, the identified code may be a code image of a storage region that stores the boot code.

Method 400 may perform operation 404 during which the portion of code may be received at a secured execution environment in response to the boot operation being initiated. As discussed above, the secured execution environment may be configured to provide an RoT that may be part of a chain of trust. In some embodiments, the secured execution environment includes one or more processing devices configured to execute processing operations within the secured execution environment. Accordingly, during operation 404, a processing device of the secured execution environment may retrieve the code associated with the boot operation.

Method 400 may perform operation 406 during which a first hash computation may be performed on an image of the received code. As similarly discussed above, a cryptographic computation may be performed to compute an integrity check value. In one example, such a cryptographic computation may be a hash computation that is used to compute a hash value. Accordingly, during operation 406, a first hash value may be computed based on the retrieved code.

Method 400 may perform operation 408 during which a signature computation operation may be performed based, at least in part, on an asymmetric cryptographic function. As similarly discussed above, the signature computation operation may be a secured signature computation used to compute a signature value based on a signed version of a hash value that may have included with the code received during operation 402. Accordingly, a signed version of a precomputed hash value may have been included with the code or retrieved in addition to that code, and during operation 408, a signature computation operation may be performed to compute a signature value for the signed version of the hash value. In various embodiments, the signature value may be computed in accordance with an authentication algorithm, such as ECC or RSA.

Method 400 may perform operation 410 during which it may be determined if a result of the signature computation is verified. Accordingly, the signature may then be verified using a public key associated with the authentication algorithm used to sign the precomputed hash value. Accordingly, the signature of the precomputed hash value may be verified, and a result of such verification may be used to determine if the precomputed hash value is authentic and may be used for subsequent verification operations. Accordingly, if it is determined that the result of the signature computation is not verified, method 400 may terminate. If it is determined that the result of the signature computation is verified, method 400 may proceed to operation 412.

Method 400 may perform operation 412 during which it may be determined if the code image is verified. Accordingly, the result of the first hash computation that was computed during operation 406 may be compared against the precomputed verified hash value. In various embodiments, one or more additional rules may be implemented for verification. For example, a time stamp may be associated with the code image, and may be used to determine if the code image is older than a permissible threshold value of time. If it is determined that the results do not match and the hash values are different, method 400 may determine the code image is not verified, and may terminate. If it is determined that the results do match and the hash values are the same, method 400 may determine that the code image is verified and may proceed to operation 414.

Method 400 may perform operation 414 during which a result of the first hash computation may be stored in a secured location. Accordingly, the result of the first hash computation may be stored in the secured location which may be a secured cached that is only accessible by the secured execution environment. Furthermore, the result may be stored in accordance with one or more security rules, as discussed above. As will be discussed in greater detail below, the stored result may be used in subsequent boot operations that may occur in response to subsequent triggering events. Moreover, the stored result may be used to bypass signature computations that may otherwise occur in such subsequent boot operations.

Method 400 may perform operation 416 during which a second boot operation may be performed. Accordingly, having verified and authenticated the code, the secured execution environment may perform the first boot operation as well as proceed to a second boot operation which may be a next stage of a chain of trust. In this way, such verification and authentication may be performed in the context of a chain of trust, and one or more components of the secured execution environment may be used to implement additional boot operations to continue the boot process.

Figure 5:
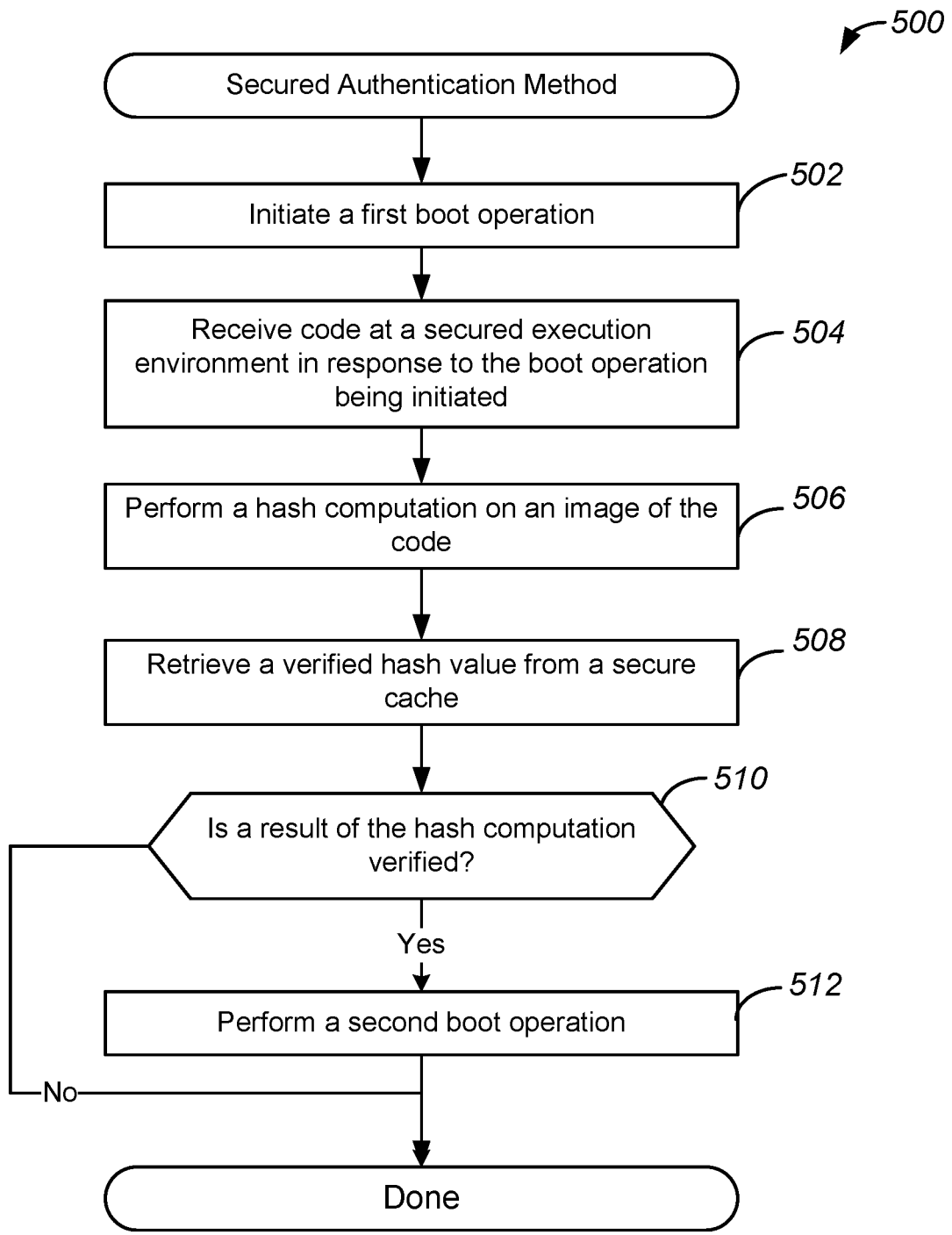
FIG. 5 illustrates an example of yet another method for secured authentication operations, implemented in accordance with some embodiments.

FIG. 5 illustrates an example of yet another method for secured authentication operations, implemented in accordance with some embodiments. As will be discussed in greater detail below, a method, such as method 500 may be performed to implement validation and authentication operations. As discussed above, an authentication process may be split into different stages, thus enabling results from one or more signature computation operations to be leveraged towards subsequent iterations, and avoiding redundancy of such signature computation operations. Accordingly, as will be discussed in greater detail below, a secured storage location may be used to store a cached version of data values underlying such verification and authentication operations thus reducing the need to recompute such data values during system events, such as a wake operation.

Method 500 may perform operation 502 during which a boot operation may be initiated. As discussed above, a boot operation may be performed in response to a particular triggering event. In various embodiments, the triggering event may be a wake operation. More specifically, a device for which method 500 is performed may have previously been initialized and booted, and may have been placed in a sleep mode or a low power mode. The device may have received an input or identified a system event to transition to a wake mode or an active mode. Such a transition may include one or more boot operations. Accordingly, during operation 502, code associated with such a boot operation may be identified. Such code may be stored in system memory. As discussed above, the identified code may be a code image of a storage region that stores the boot code.

Method 500 may perform operation 504 during which code may be received at a secured execution environment in response to the boot operation being initiated. As discussed above, the secured execution environment may be configured to provide an RoT that may be part of a chain of trust. As also discussed above, the secured execution environment includes one or more processing devices configured to execute processing operations within the secured execution environment. Accordingly, during operation 504, a processing device of the secured execution environment may retrieve the code associated with the boot operation.

Method 500 may perform operation 506 during which a hash computation may be performed on an image of the received code. As similarly discussed above, a cryptographic computation may be performed to compute an integrity check value. In one example, such a cryptographic computation may be a hash computation that is used to compute a hash value. Accordingly, during operation 506, a first hash value may be computed based on the retrieved code.

Method 500 may perform operation 508 during which a verified hash value may be retrieved from a secured storage location. Accordingly, a secured storage location within the secured execution environment may be identified, and a verified hash value may be identified within the secured storage location. As similarly discussed above, the verified hash value stored in the secured storage location may have been generated and stored during a previous boot operation, as may have occurred during initialization or powering on of the device. Moreover, the secured storage location may be a secured cache that may have one or more read/write permissions rules. For example, the secured cache may only permit write operations on reset or power up.

Method 500 may perform operation 510 during which it may be determined if a result of the hash computation is verified. Accordingly, the result of the first hash computation that was computed during operation 506 may be compared against the verified hash value retrieved from the secured storage location. Moreover, as disused above, additional rules may be used for verification. If it is determined that the results do not match and the hash values are different, method 500 may terminate. If it is determined that the results do match and the hash values are the same, method 500 may proceed to operation 512.

Method 500 may perform operation 512 during which a second boot operation may be performed. Accordingly, having verified and authenticated the code, the secured execution environment may perform the boot operation as well as proceed to an additional boot operation which may be a next stage of a chain of trust. In this way, such verification and authentication may be performed in the context of a chain of trust, and one or more components of the secured execution environment may be used to implement additional boot operations to continue the boot process.

Figure 6:
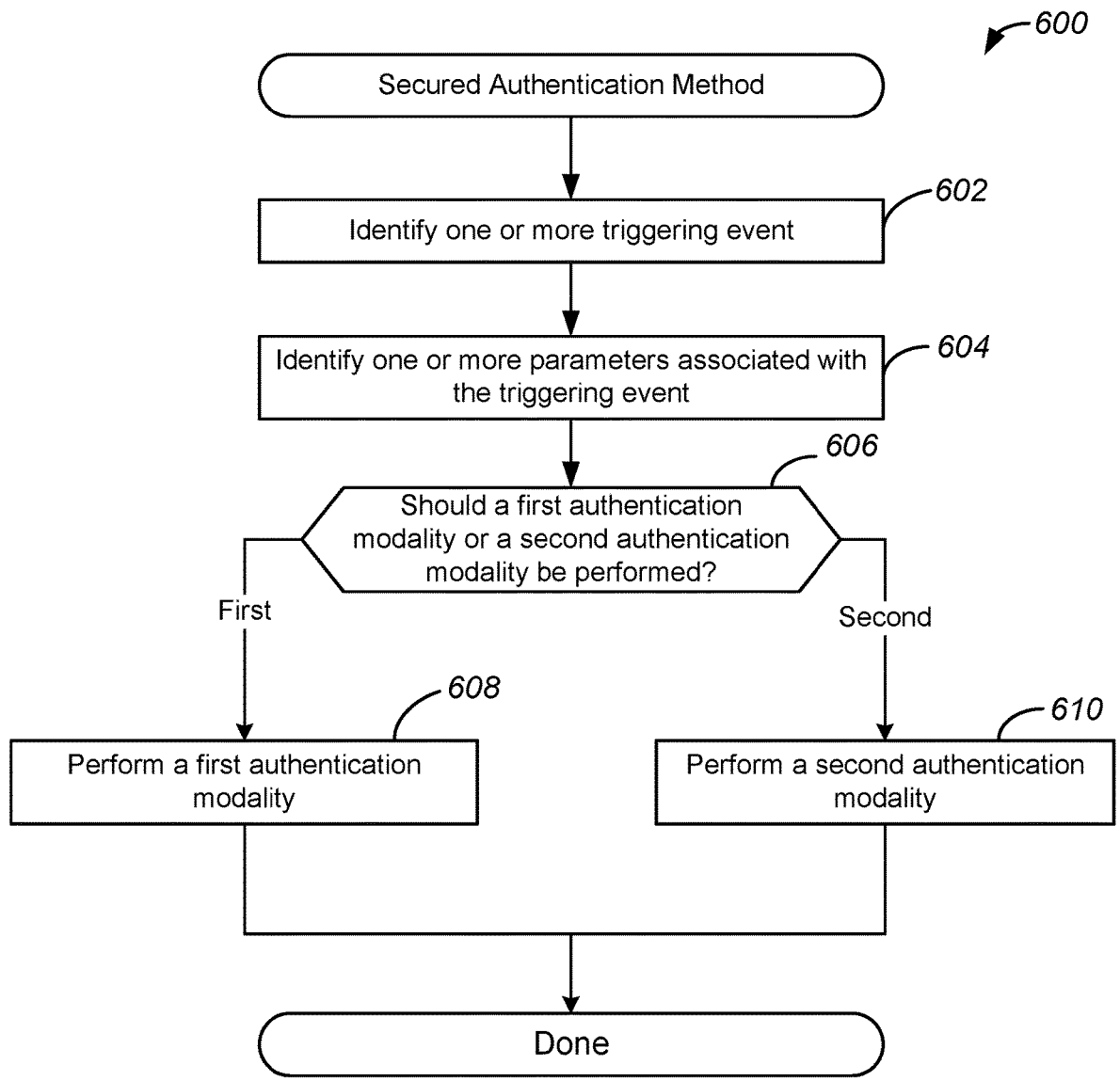
FIG. 6 illustrates an example of an additional method for secured authentication operations, implemented in accordance with some embodiments.

FIG. 6 illustrates an example of an additional method for secured authentication operations, implemented in accordance with some embodiments. As will be discussed in greater detail below, a method, such as method 600 may be performed to implement validation and authentication operations that may be split into different stages, thus enabling results from one or more signature computation operations to be leveraged towards subsequent iterations. As will be discussed in greater detail below, a particular authentication modality may be selected and performed based on one or more aspects of a triggering event. In this way, the reduction of processing overhead and latency described above may be performed in dynamic manner.

Method 600 may perform operation 602 during which one or more triggering events may be identified. As discussed above, the one or more triggering events may be events that trigger a boot operation, such as a device being powered on or a device being woken from a sleep state or a lower power mode. In various embodiments, the triggering event may be an input received from an entity, such as a user. The triggering event may be a signal received from another system component that causes a transition of the device from one mode to another. Accordingly, during operation 602, one or more triggering events may be identified by one or more components of a secured execution environment based on a received signal.

Method 600 may perform operation 604 during which one or more parameters associated with the triggering event may be identified. In some embodiments, the one or more parameters may identify one or more features of the triggering event. For example, the parameters may identify the received signal as being associated with an initialization or power-up operation. In another example, the parameters may identify the received signal as being associated with a wake operation. Accordingly, one or more identifiers associated with the received signal may be identified and used to identify features of the triggering event itself.

Method 600 may perform operation 606 during which it may be determined if a first or second authentication modality should be performed. In various embodiments, such a determination may be made based on whether or not a verified cryptographic value is stored in a secured storage location. As discussed above, such a verified cryptographic value may be a verified hash value that was previously computed during a previous signature computation and verification operation. As also discussed above, the verified cryptographic value may have been cached in secured storage location. Accordingly, if a verified cryptographic value is not stored in a secured storage location, then a first authentication modality may be selected. If a verified cryptographic value is stored in a secured storage location, then a second authentication modality may be selected. In some embodiments, such a determination may be made based on the one or more parameters. For example, if parameters identify power-up or initialization operation, then the first authentication modality may be selected. If the one or more parameters identify a wake operation, then the second authentication modality may be selected.

Accordingly, if it is determined that a first authentication modality should be implemented, method 600 may proceed to operation 608 during which the first authentication modality may be performed. In some embodiments, the first authentication modality may be a modality in which the signature computation operations are performed to verify a cryptographic value during the boot operation. Accordingly, if the first authentication modality is performed, a method such as that discussed above with reference to FIG. 4, may be performed.

Returning to operation 606, if it is determined that a second authentication modality should be implemented, method 600 may proceed to operation 610 during which the second authentication modality may be performed. In some embodiments, the second authentication modality may be a modality in which the verified cryptographic value is retrieved from a secured storage location. Accordingly, if the second authentication modality is implemented, a method such as that discussed above with reference to FIG. 5, may be implemented. More specifically, data values stored in a secured cache included in the secured execution environment may be used for authentication during the boot operation.

Although the foregoing concepts have been described in some detail for purposes of clarity of understanding, it will be apparent that certain changes and modifications may be practiced within the scope of the appended claims. It should be noted that there are many alternative ways of implementing the processes, systems, and devices. Accordingly, the present examples are to be considered as illustrative and not restrictive.

What is claimed is:

1. A method comprising:
    performing, using one or more processing elements of a secured execution environment, a first cryptographic computation on a portion of code to generate a result;
    determining, using the one or more processing elements, if a verified result is stored in a secured storage location;
    in response to determining that the verified result is stored, retrieving the verified result from the secured storage location;
    in response to determining that no verified result is stored, determining, using the one or more processing elements, an authenticated version of a cryptographic value, the authenticated version of the cryptographic value being determined based on a signature computation and a second cryptographic computation that is an asymmetric cryptographic computation; and
    determining, using the one or more processing elements, if the result of the first cryptographic computation is verified based, at least in part, on a comparison of the result with the verified result or the authenticated version of the cryptographic value.

2. The method of claim 1 further comprising:
    storing the result in a secured storage location included in the secured execution environment in response to determining that the result is verified.

3. The method of claim 2, wherein the result of the first cryptographic computation is determined to be verified based on the result matching the authenticated version of the cryptographic value.

4. The method of claim 3, wherein the first cryptographic computation is a hash computation.

5. The method of claim 1, wherein the first cryptographic computation is performed in response to a triggering event.

6. The method of claim 5, wherein the triggering event comprises an initiation of a boot operation, and wherein the portion of code is boot code.

7. The method of claim 5, wherein the triggering event is a request for a transition of at least the one or more processing elements from a sleep mode of operation to a wake mode of operation.

8. The method of claim 7, wherein the determining of the authenticated version of the cryptographic value further comprises:
retrieving, using the processor, the authenticated version of the cryptographic value from a secured storage location, wherein the secured storage location is a secured cache.

9. The method of claim 8, wherein the retrieving the authenticated version of the cryptographic value from the secured storage location is performed in response to identifying the request for the transition to the wake mode.

10. A system comprising:
a nonvolatile memory configured to store a portion of code;
a secured cache comprising one or more secured storage regions; and
one or more processing elements included in a processor implemented in a secured execution environment, the processor being configured to:
perform a first cryptographic computation on a portion of code to generate a result;
determine if a verified result is stored in a secured storage location;
in response to determining that the verified result is stored, retrieve the verified result from the secured storage location;
in response to determining that no verified result is stored, determine an authenticated version of a cryptographic value, the authenticated version of the cryptographic value being determined based on a signature computation and a second cryptographic computation that is an asymmetric cryptographic computation; and
determine if the result of the first cryptographic computation is verified based, at least in part, on a comparison of the result with the verified result or the authenticated version of the cryptographic value.

11. The system of claim 10, wherein the processor is further configured to:
store the result in the secured cache in response to determining that the result is verified.

12. The system of claim 11, wherein the result of the first cryptographic computation is determined to be verified based on the result matching the authenticated version of the cryptographic value, and wherein the first cryptographic computation is a hash computation.

13. The system of claim 10, wherein the first cryptographic computation is performed in response to a triggering event, wherein the triggering event comprises an initiation of a boot operation, and wherein the portion of code is boot code.

14. The system of claim 10, wherein the first cryptographic computation is performed in response to a triggering event, and wherein the triggering event is a request for a transition of at least the one or more processing elements from a sleep mode of operation to a wake mode of operation.

15. The system of claim 14, wherein the determining of the authenticated version of the cryptographic value further comprises:
retrieving, using the processor, the authenticated version of the cryptographic value from a secured storage location in response to identifying the request for the transition to the wake mode, wherein the secured storage location is a secured cache.

16. A device comprising:
a secured cache comprising one or more secured storage regions; and
one or more processing elements included in a processor implemented in a secured execution environment, the processor being configured to:
perform a first cryptographic computation on a portion of code to generate a result;
determine if a verified result is stored in a secured storage location;
in response to determining that the verified result is stored, retrieve the verified result from the secured storage location;
in response to determining that no verified result is stored, determine an authenticated version of a cryptographic value, the authenticated version of the cryptographic value being determined based on a signature computation and a second cryptographic computation that is an asymmetric cryptographic computation; and
determine if the result of the first cryptographic computation is verified based, at least in part, on a comparison of the result with the verified result or the authenticated version of the cryptographic value.

17. The device of claim 16, wherein the processor is further configured to:
store the result in the secured cache in response to determining that the result is verified,
wherein the result of the first cryptographic computation is determined to be verified based on the result matching the authenticated version of the cryptographic value, and wherein the first cryptographic computation is a hash computation.

18. The device of claim 16, wherein the first cryptographic computation is performed in response to a triggering event, wherein the triggering event comprises an initiation of a boot operation, and wherein the portion of code is boot code.

19. The device of claim 16, wherein the first cryptographic computation is performed in response to a triggering event, and wherein the triggering event is a request for a transition of at least the one or more processing elements from a sleep mode of operation to a wake mode of operation.

20. The device of claim 19, wherein the determining of the authenticated version of the cryptographic value further comprises:
retrieving, using the processor, the authenticated version of the cryptographic value from a secured storage location in response to identifying the request for the transition to the wake mode, wherein the secured storage location is a secured cache.

* * * * *